March 31, 1942. N. W. FRANZKOWIAK 2,277,966
CONTROL LEVER FOR FARM IMPLEMENTS
Filed April 12, 1940
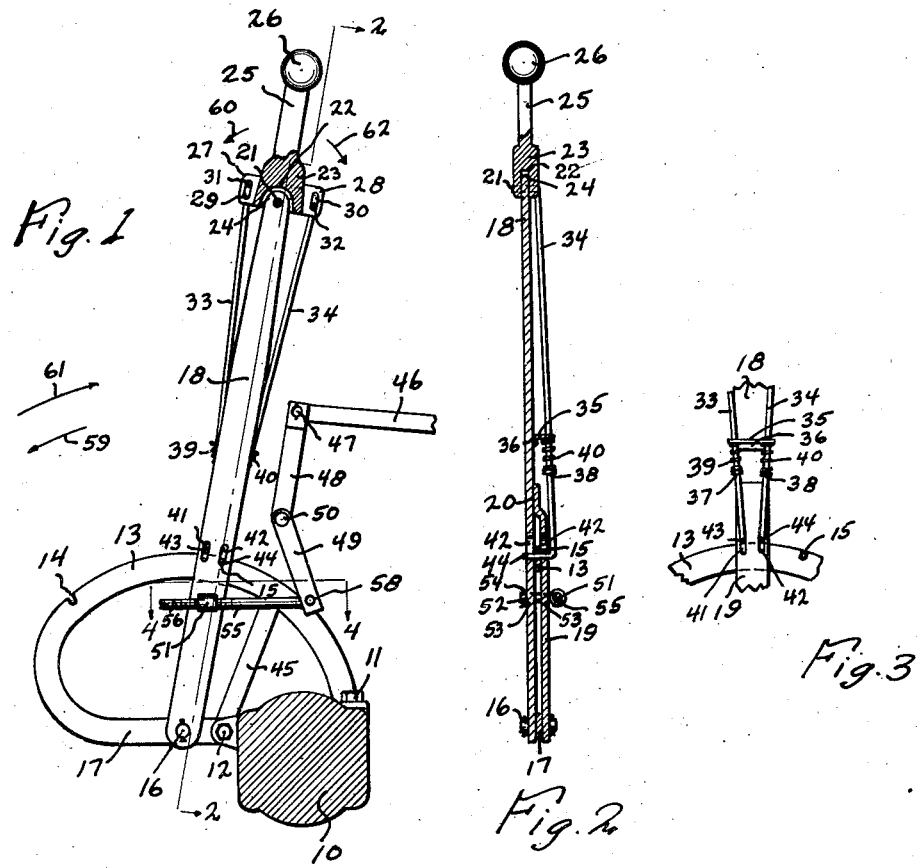
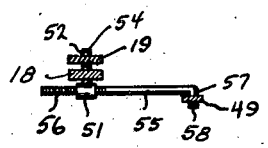
INVENTOR.
Nicholas W. Franzkowiak
BY Sam J. Slotsky
ATTORNEY.

Patented Mar. 31, 1942

2,277,966

UNITED STATES PATENT OFFICE 2,277,966

CONTROL LEVER FOR FARM IMPLEMENTS

Nicholas W. Franzkowiak, Schaller, Iowa

Application April 12, 1940, Serial No. 329,351

3 Claims. (Cl. 74—536)

My invention relates to a control lever for operating pivotal or moving parts.

An object of my invention is to provide a control lever which functions automatically as the lever handle is pushed forwardly or rearwardly, thereto eliminating the necessity of the hand compression type member.

A further object of my invention is to provide a control lever which can be used for any type of farm implement or for other purposes and which requires no attention by the operator other than the simple action of forward or rearward movement.

A further object of my invention is to provide a control lever which includes means for adjusting the same to guide bars of different types or for other adjusting purposes.

A further object of my invention is to provide a control lever which can be operated easily from any position and which is convenient to operate from a side location.

A further object of my invention is to provide a lever of this type which is of simple construction and which can be manufactured at a reasonable cost.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of the lever as attached to a farm tractor,

Figure 2 is a sectional view taken substantially along the lines 2—2 of Figure 1, Figure 3 is a detail, and Figure 4 is a detail taken along the lines 4—4 of Figure 1.

I have used the character 10 to designate generally the rear transmission housing of a tractor to which is attached at 11 and 12 an arcuate guide bar 13 which includes the recessed notches 14 and 15. Pivotally attached by means of the pin 16 to the lower portion 17 of the guide bar 13 is the vertical lever member 18 and the further member 19 which straddle the guide bar 13 and which are joined together at 20. The member 18 continues upwardly and is pivoted at 21 by means of a suitable pin within the cavity 22 which cavity is located in the handle extension 23. Sufficient space is left between the upper end of the lever 18, or at 24, and the cavity 22 to allow free rockable movement of the handle member. The portion 23 extends into the further portion 25, and attached to the portion 25 is the round ball 26 which is of fairly substantial size sufficient to provide a convenient grasp by the hand. Attached to either side of the portion 23 are the extending ears 27 and 28 which include the vertical slots 29 and 30. It should be noted especially that the bottom portions of the slots 29 and 30 are flush or level with the pivoting point 21.

Received within the slots 29 and 30 are the horizontally bent ends 31 and 32 of the respective control rods 33 and 34, which rods pass through the keeper 35 which is attached at 36 to the lever 18. A pair of washers 37 and 38 are attached to the rods 33 and 34, and receiving these rods are the respective compression springs 39 and 40 which are positioned between the member 35 and locked washers 37 and 38. The lower ends of the lever members 18 and 19 include the slots 41 and 42 which coincide exactly and which are positioned in the lever members so that the lower end of the slots 41 and 42 coincide with the notches 14 and 15. The lower ends of the rods 33 and 34 terminate in the horizontal inwardly extending portions 43 and 44 which are received within the notches 41 and 42, and it will be observed that the notches 41 and 42 extend a slight distance above the upper edge of the member 13 and are approximately the same length as the upper slots 29 and 30.

The character 45 indicates a brace member used to brace the member 13. The control lever is adapted to operate the forwardly extending rods 46 which are usually provided in pairs for operating shovels or various other types of farm equipment for causing penetration into the soil or for other purposes, the function of the lever being to raise or lower these devices through the medium of the rod 46. The rod 46 is pivoted in the usual manner at 47 to the further arm 48 which is rigidly attached to the further arm 49, these pair of arms being pivoted at 50 to the tractor body itself, so that corresponding movement of the arm 49 will move the arm 48 and correspondingly swing the rod 46 to operative or inoperative position of the various types of implements at the end thereof. To effect adjustment of the lever for penetrating depth of the shovel, etc., or also to adjust the lever for different spacings of the notches 14 and 15, I provide the threaded cylindrical member 51 to which is attached the pin 52 which passes through the levers 18 and 19 at 53 and is locked by means of the key 54.

Threadably engaged with the member 51 is the rod 55 which includes the threaded portion 56 and which rod 55 includes the transversely bent portion 57 which is suitably received through the lower end of the arm 49 at 58 and is retained by a suitable key.

Now that the structure of my device has been explained, I shall explain the operation thereof, Figure 1 illustrates the lever in the forward position, or it can be used to explain the position wherein the shovels attached to the member 46 are out of engagement. In operating the lever the operator grasps the round portion 26 and pulls the lever in the direction of the arrow 59. It should be noted from Figure 1 that before pulling the lever in this direction, it is locked in the forward position since the projecting portion 44 of the rod 34 has been forced by the spring 40 into the lower portions of the slots 42. Since the lever is pulled in the direction of the arrow 59, however, the first tendency will be for the handle 25 to rock upon the pivot 21 in the direction of the arrow 60 (see Fig. 1). This operation automatically draws the rod 34 upwardly due to engagement of the extension 32 with the slot 30 as shown, and draws the portion 44 out of the notch 15. Meanwhile, the extension 43 of the rod 33 is riding against the upper edge of the member 13. The lever is now disengaged and is travelling in the direction of the arrow 59 and, as shown in Fig. 3, at the neutral position or midpoint of such travel, both extensions 43 and 44 will be riding against the top edge of the arcuate member 13. When the lever swings to a position near the notch 14, the extension 43 of the rod 33 will be forced into the notch 14 by the spring 39 due to the pressure thereof, and the lever will be automatically again locked into the other position.

The reverse action takes place when the lever is forced in the direction of the arrow 61, when the handle 25 will pivot in the direction of the arrow 62 causing a corresponding disengagement of the portion 43, and the lever will again travel forwardly until the portion 44 is forced into the notch 15. By virtue of this construction, it will be seen that it is not necessary to give the lever any attention other than the simple act of moving it forwardly or rearwardly as desired. Since the tractor seats are usually located directly to one side of the lever, the round ball handle 26 permits convenient movement of the lever since, when the arm is moved in a sideways manner, the hand will freely revolve about the ball 26 without cramping the operator, and in this manner the lever is accommodated to the seating position conveniently. The arm can remain in normal operating position due to this structure without bending and twisting the same since the ball permits graspment from any position during the movement of the lever.

It will be noted that if it is desired to adjust the movable arc of the lever with respect to the distance between the notches 14 and 15 on various types of equipment, this effect can be provided by simply removing the pins 52 and 57 from engagement with the members 18, 19, and 49, and by turning the threads 56 within the member 51 so that the distance between the member 51 and the point 58 is made correspondingly longer or shorter as desired, thereby also effecting the same relative adjustment at that portion of the lever where the rod extensions engage the notches. This adjustment, then, compensates for this feature as well as other features which may be desirable in adjusting the penetration depth of the various implements used and for other necessary reasons.

It will now be seen that I have provided a control lever which functions automatically as the lever handle is pushed forwardly or rearwardly, which eliminates the necessity of hand compression levers, which includes means for adjusting the same for various purposes, which is easily operable from side positions, and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A control lever comprising a pivoted lever member, a guide bar adjacent thereto having a pair of spaced limiting notches, means attachable to said pivoted lever member to engage either of said notches upon forward or rearward movement of said lever member, including an upper rockable portion pivoted to said lever member, means attached between said rockable portion and said notches for retaining said lever member in locked position when adjacent to either of said notches, including a pair of ears attached to said rockable portion having slots therein, a pair of rods having ends engaged in said slots, said lever member having slots positioned adjacently to said guide bar and adapted to register with said notches, the lower end of said rods engaged within said latter slots.

2. A control lever comprising a pivoted lever member, a guide bar adjacent thereto having a pair of spaced limiting notches, means attachable to said pivoted lever member to engage either of said notches upon forward or rearward move of said lever member, including an upper rockable portion pivoted to said lever member, means attached between said rockable portion and said notches for retaining said lever member in locked position when adjacent to either of said notches, including a pair of ears attached to said rockable portion having slots therein, a pair of rods having ends engaged in said slots, said lever member having lower slots positioned adjacently to said guide bar and adapted to register with said notches, the lower end of said rods having extensions engaged within said lower slots, means for normally spring urging said rods downwardly for forcing the lower rod extensions into said notches when positioned in coinciding relation therewith.

3. A lever comprising a pivoted lever member, a guide bar adjacent thereto having a pair of spaced limiting notches, means attachable to said pivoted lever member to engage either of said notches upon forward or rearward movement of said lever member, including an upper rockable portion pivoted to said lever member, means attached between said rockable portion and said notches for retaining said lever member in locked position when adjacent to either of said notches, including a pair of ears attached to said rockable portion having slots therein, a pair of rods having ends engaged in said slots, said lever member having lower slots positioned adjacently to said guide bar and adapted to register with said notches, the lower end of said rods having extensions engaged within said lower slots, means for normally spring urging said rods downwardly for forcing the lower rod extensions into said notches when positioned in coinciding relation therewith, said rockable portion including a spherical hand grasping member at the top thereof to provide convenient manipulation thereof from a lateral position.

NICHOLAS W. FRANZKOWIAK.